US 6,292,995 B1

(12) United States Patent
Corbin et al.

(10) Patent No.: US 6,292,995 B1
(45) Date of Patent: Sep. 25, 2001

(54) POWDER COATING AS SUBSTRATE FOR EPOXY BONDING OF VIBRATION ISOLATION MOUNTS

(75) Inventors: Douglas C. Corbin; David G. Siciliano, both of Findlay, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 08/976,672

(22) Filed: Nov. 24, 1997

(51) Int. Cl.⁷ .................................................. B21D 39/00
(52) U.S. Cl. ......................... 29/428; 29/897.2; 29/527.2; 156/307.3; 156/308.6
(58) Field of Search ................................ 29/527.1, 469.5, 29/897.2, 428, 527.2; 156/218, 307.1, 308.6, 330, 307.3

(56) References Cited

U.S. PATENT DOCUMENTS

| | | | | |
|---|---|---|---|---|
| 3,342,660 | * | 9/1967 | Angerer et al. | 156/307.7 |
| 3,501,564 | * | 3/1970 | Snoeyenbos et al. | 156/307.1 |
| 3,528,943 | * | 9/1970 | Goldberg et al. | 156/333 |
| 3,547,764 | * | 12/1970 | Amerongen et al. | 152/564 |
| 3,595,826 | * | 7/1971 | Conard et al. | 156/333 |
| 3,640,941 | * | 2/1972 | Findley et al. | 156/333 |
| 3,667,993 | * | 6/1972 | Eugene | 156/329 |
| 3,677,809 | * | 7/1972 | Klement et al. | 156/333 |
| 3,748,291 | * | 7/1973 | Bhakuni et al. | 156/307.3 |
| 3,751,331 | * | 8/1973 | Dane et al. | 156/307.7 |
| 3,821,017 | * | 6/1974 | Bhakuni et al. | 156/307.3 |
| 3,826,772 | * | 7/1974 | Gebhard et al. | 156/333 |
| 4,121,963 | * | 10/1978 | Yarley et al. | 156/307.3 |
| 5,153,076 | * | 10/1992 | Jadamus et al. | 156/307.1 |
| 5,178,713 | * | 1/1993 | Matz | 156/281 |
| 5,330,601 | * | 7/1994 | Gottschalk | 156/281 |
| 5,356,504 | * | 10/1994 | Maurice | 156/281 |
| 5,503,698 | * | 4/1996 | Goldberg et al. | 156/281 |
| 5,800,655 | * | 9/1998 | Tokuchi | 156/281 |

* cited by examiner

*Primary Examiner*—I Cuda Rosenbaum
*Assistant Examiner*—T. Nguyen
(74) *Attorney, Agent, or Firm*—Meredith E. Palmer; John H. Hornickel; Michael Sand

(57) ABSTRACT

A method of producing a vibration isolation mount assembly comprising at least one metal bracket member bonded to a volume of a resilient elastomeric material. The bonding of the elastomeric material to the metal bracket is improved by electrostatically spraying the metal brackets with an epoxy coating prior to adhering the rubber to the metal bracket members, but after vulcanization of the rubber material.

8 Claims, 6 Drawing Sheets

POWDER COATING AS SUBSTRATE FOR EPOXY BONDING OF VIBRATION ISOLATION MOUNTS

FIELD OF THE INVENTION

The present invention relates to a method of producing a vibration isolation mount assembly comprising at least one metal bracket member bonded to a volume of a resilient elastomeric material. The bonding of the elastomeric material to the metal bracket is improved by electrostatically spraying the metal brackets with an epoxy coating prior to adhering the rubber to the metal bracket members, but after vulcanization of the rubber material. The resulting adhesive bond between the rubber and the epoxy-coated metal bracket is stronger, more corrosion-resistant and capable of surviving a high temperature environment.

BACKGROUND OF THE INVENTION

Vibration isolation mount assemblies, also referred to as engine or powertrain mounts, are used in vehicles to isolate the vibrations produced by the engine and/or powertrain assemblies of a motor vehicle. These assemblies usually are made of two structural members or metal bracket members bonded to a volume of a resilient material, such as rubber, by an adhesive means. These assemblies must be strong enough to withstand the large number of cyclic vibrations associated with engines or powertrains. In addition, the assemblies must be able to withstand the various atmospheric events which cause corrosion of metal components. While satisfying these engineering conditions, the assemblies also must be cost-effective, which means they must be economical to produce from readily available engineering materials associated with automobile manufacture.

Various constructions and methods have been utilized in the past to manufacture engine and powertrain mounts which meet these conditions. One such construction is described in U.S. Pat. No. 4,987,679 to Rau dated Jan. 29, 1991, entitled "Vehicular Powertrain Mount Assembly". The engine mount of this patent is manufactured from a pair of metal brackets which are bonded to a volume of vulcanized rubber sandwiched between the brackets, at least one of which is a stamped cold-rolled steel. The bonding material between the rubber and the metal brackets is a two part epoxy adhesive. While Rau clearly discloses bonding between metal and rubber, Rau does not disclose the use of any precoating on the metal brackets. However, in order to obtain the required corrosion resistance to withstand the hostile environment of an automotive mount while still avoiding premature failure resulting from stress-corrosion mechanisms, it is necessary to utilize some sort of metal preparation, particularly for ferrous alloys such as steel. Typical metal preparations include zinc coating, phosphate coating or other coating procedure, such as E-coat. Typically, E-coats can survive corrosive conditions, but fail in elevated temperature applications and contain undesirable heavy metal additives such as lead. However, it is well known that structures such as taught by Rau fail generally at the interface between the corrosion-resistant metal coating and the metal, resulting in a debonding between the rubber and the metal. The failure typically is not due to the strength of the adhesive, typically an epoxy, but due to the quality of the adhesion at the adhesive-metal coating interface. Coatings such as phosphate offer good adhesion under dry, ambient conditions, but have inferior performance in extreme conditions since phosphate does not provide sufficient protection from corrosive elements. Since Rau teaches a metal to rubber bond interface, a corrosion-resistant coating must be applied to steel, and all known metal coatings utilized to provide the necessary corrosion resistance also pose some environmental concern for the manufacturer.

U.S. Pat. No. 5,030,515 to Ozawa dated Jul. 9, 1991 provides a different solution for bonding rubber to metal. Ozawa teaches bonding metal to vulcanized rubber by spraying coating or dipping a primer consisting of an epoxidized diene to first coat the metal surface. The primer coat is obtained by mixing diene polymer with epoxidizing agent and filler materials in a solvent. After this epoxidized rubber primer coat is allowed to dry (i.e. the solvent is allowed to evaporate), a covercoat adhesive consisting of a halogenated polymer or rubber adhesive composition is applied over the primer coat, which in turn is allowed to dry. The surface containing the covercoat and the rubber surface are brought together and cured by heating at an elevated temperature, 250°–400° F. (121–205° C.). Clearly the reaction involves joining the covercoat to the unvulcanized thermoset polymer by promoting chemical bonding between the covercoat and the thermoset polymer as the polymer and the covercoat are cured together. Curing the covercoat to a vulcanized thermoset polymer would result in weak bonding and poor adhesion between the polymer and the covercoat. Furthermore, it is well known that such high curing temperatures would degrade vulcanized rubbers. All of the examples of Ozawa support bonding the uncured covercoat to an unvulcanized thermoset material as the materials are simultaneously cured.

U.S. Pat. No. 4,079,168 to Schwemmer dated Mar. 14, 1978 discloses coating a substrate with a fusible powdered epoxy resin coating composition and then heat bonding unvulcanized elastomeric compositions to the coated substrate using two stage adhesive primer systems. However, as Schwemmer notes, whole epoxy resins are generally excellent adhesives, they do not readily bond to cured rubber surfaces. When epoxy paint coating is used to join the materials after vulcanization of the rubber elements, the epoxy coating tends to crack after a period of time resulting in corrosion of the exposed underlying surface. Thus, Schwemmer's solution is to vulcanization-bond the elastomeric rubber to the epoxy-coated substrate through the adhesive system. Thus, chemical bonds are formed between the adhesive and the rubber.

However, no reliable system exists for bonding a metal substrate to vulcanized rubber, while providing both a strong bond and corrosion resistance of the interface between the substrate and the vulcanized rubber.

SUMMARY OF THE INVENTION

The present invention provides a method for bonding a vulcanized rubber surface to a metal substrate. The surface of the metal substrate first is degreased. Then epoxy powder is electrostatically sprayed on the surface of the clean metal substrate so as to cover all exposed areas of the substrate. the powder-coated substrate is then cured at a preselected elevated temperature. A volume of vulcanized rubber is provided. The surface of the rubber which is to be joined to the epoxy coated metal substrate is cleaned with a solvent which does not detrimentally affect the strength of the vulcanized rubber, yet which removes oil, grease, extraneous particles and any fillers or anti-oxidants that may bloom to the surface during or after vulcanization of the rubber. A first chemical pretreatment is applied to the rubber, which increases the surface energy of the rubber and improves its wetting performance. After the rubber surface is pretreated, a bonding agent is applied to the interface between the vulcanized rubber surface and the epoxy-coated metal substrate, and the rubber surface and the metal substrate are placed in contact with each other. Pressure is applied to the parts across the interface while the bonding agent cures so that a strong bond forms across the interface between the vulcanized rubber substrate and the epoxy-coated metal substrate.

An advantage of the present invention is that a vulcanized volume of rubber can be adhered to a metal substrate using an epoxy type adhesive in which the bond interfaces between the vulcanized rubber and the metal substrate can withstand high temperatures for extended periods without separation.

Another advantage of the present invention is that the bond and the metal bracketry are protected from corrosion by the electrostatically-applied epoxy powder coat which is more environmentally friendly than deposition by dipping, spraying etc. Furthermore, the electrostatically-applied epoxy coat is less hazardous to personnel and to the environment than commonly-used anti-corrosion coatings such as metal coatings or metal treatments.

The adhesive system of the present invention advantageously provides a bonding method which utilizes an epoxy coating without the need for a carrier solvent and which survives vibration stresses, elevated temperatures and chemical attack without the need for primers or secondary coating operations, thereby eliminating several sources of environmental hazards.

Other features and advantages of the present invention will become apparent from the following more detailed description of the preferred embodiment, taken in conjunction with the accompanying drawings, which will illustrate, by way of example, the principles of the invention

DETAILED DESCRIPTION OF THE INVENTION

Figure 1:
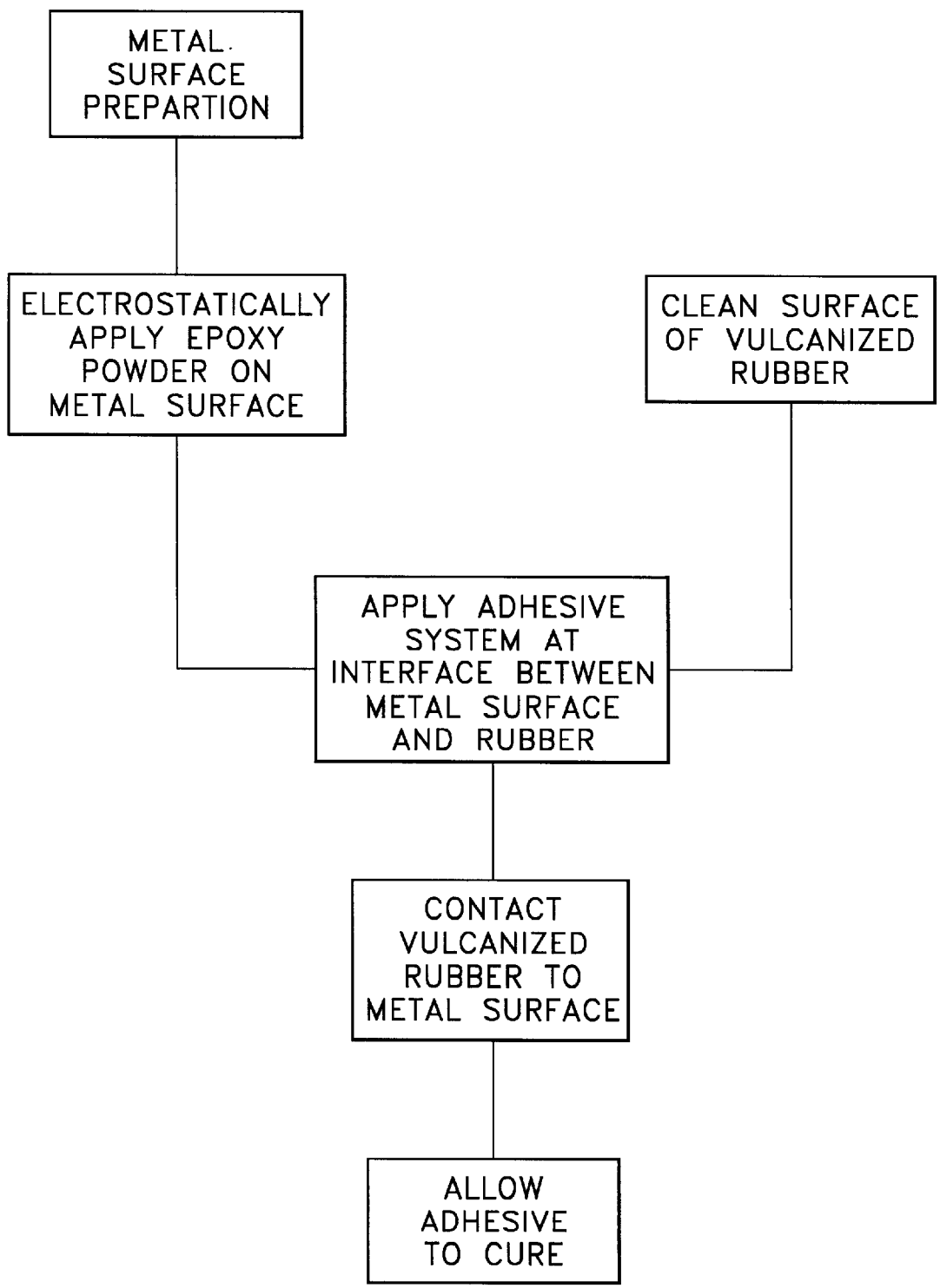
FIG. 1 is a schematic of the general method of manufacturing articles of the present invention.

The invention is directed to a method for bonding a vulcanized rubber surface to a metal substrate, while maintaining sufficient mechanical strength at the bond interface to survive vibration while maintaining corrosion resistance high temperature survivability at the bond interface. Referring to FIG. 1, the flow chart schematically shows the required steps for accomplishing the method of manufacturing articles in accordance with the present invention. More specifically, the invention is directed to a vehicular power train mount assembly which resiliently supports the powertrain member on a frame member to a motor vehicle and to a method of manufacturing such a power train mount assembly.

Figure 2:
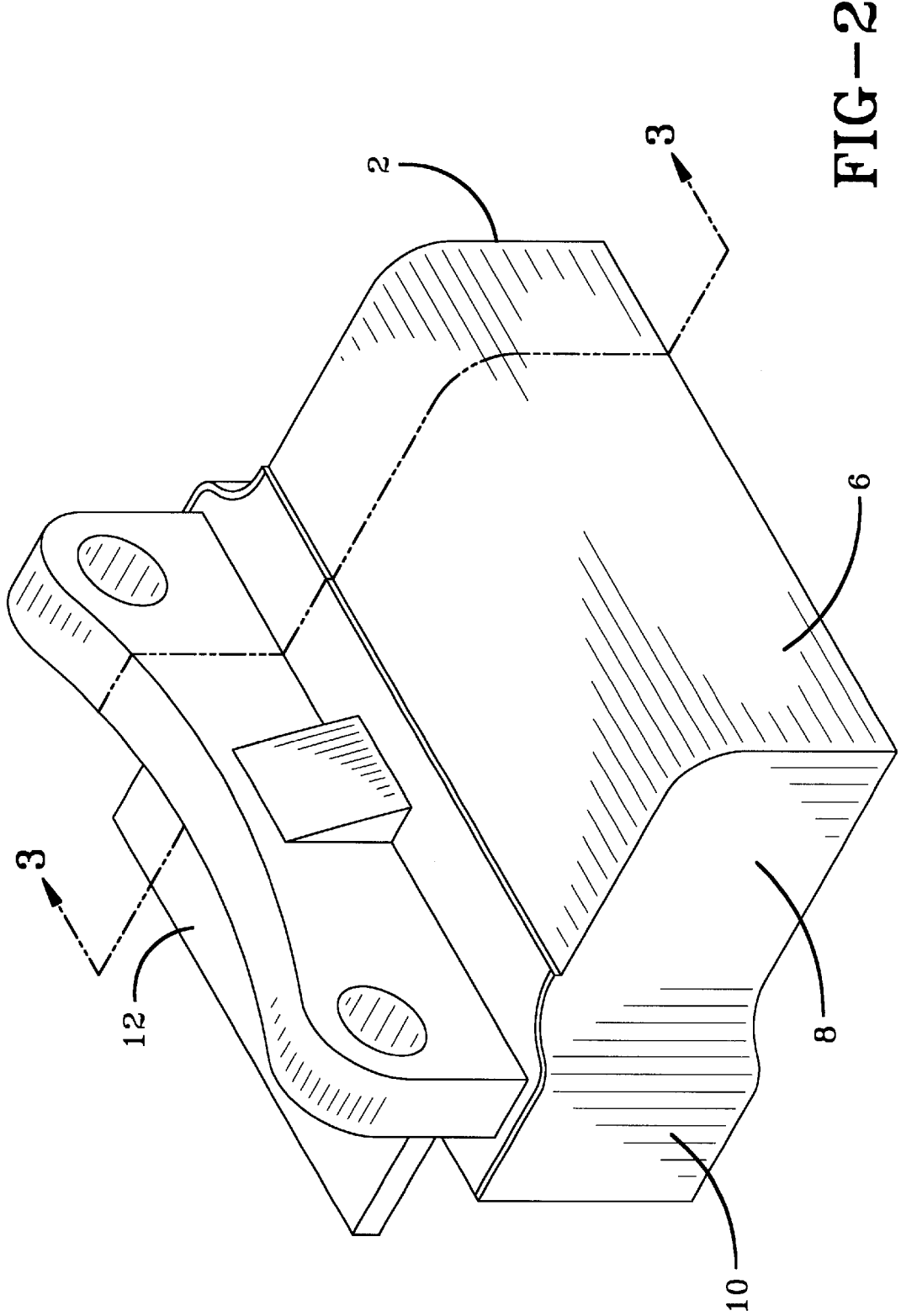
FIG. 2 is a perspective view of a bracket casting, representing the first metal substrate of the present invention.
Figure 3:
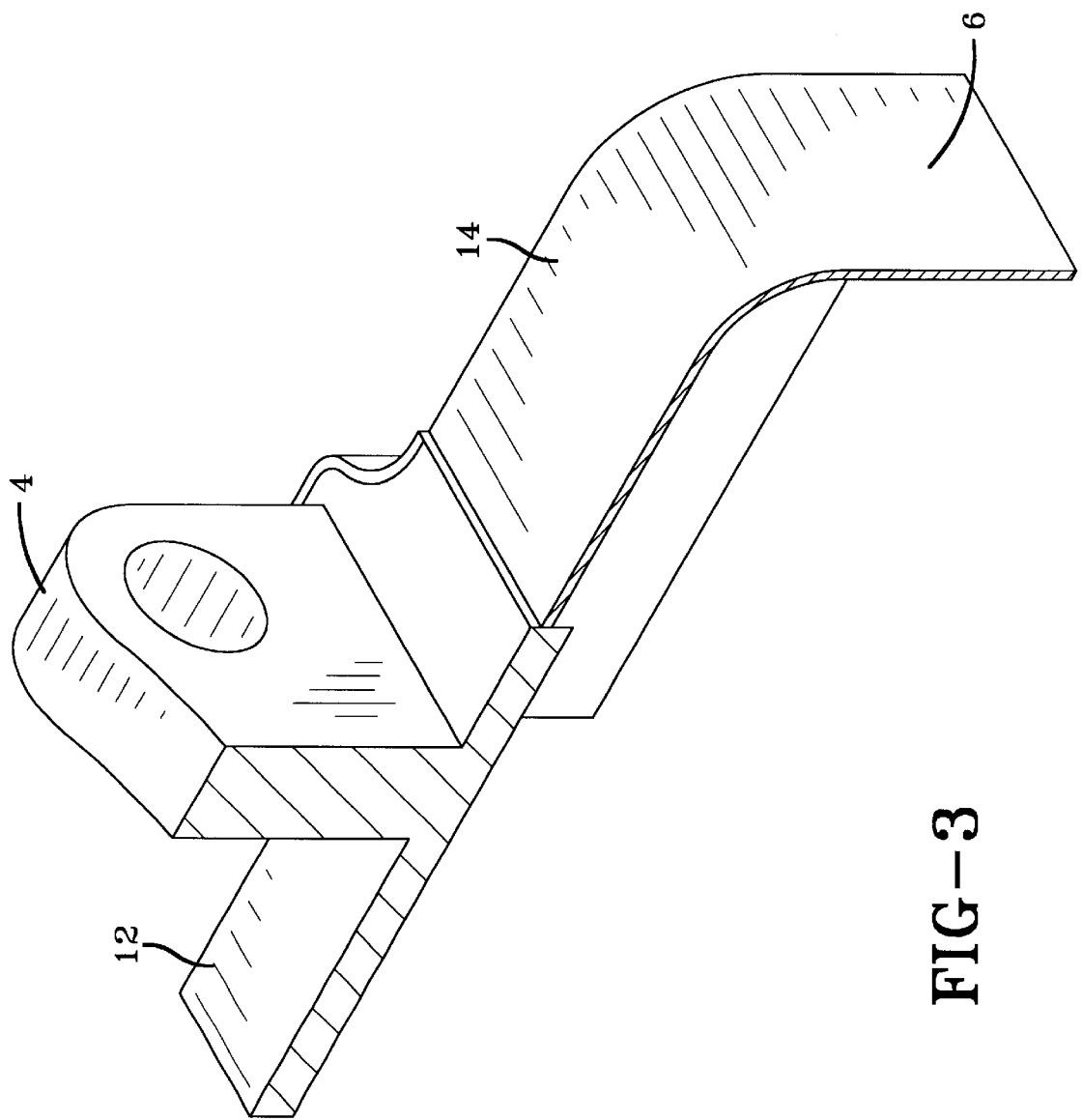
FIG. 3 a cross-sectional view of the bracket casting, showing the flanges.
Figure 4:
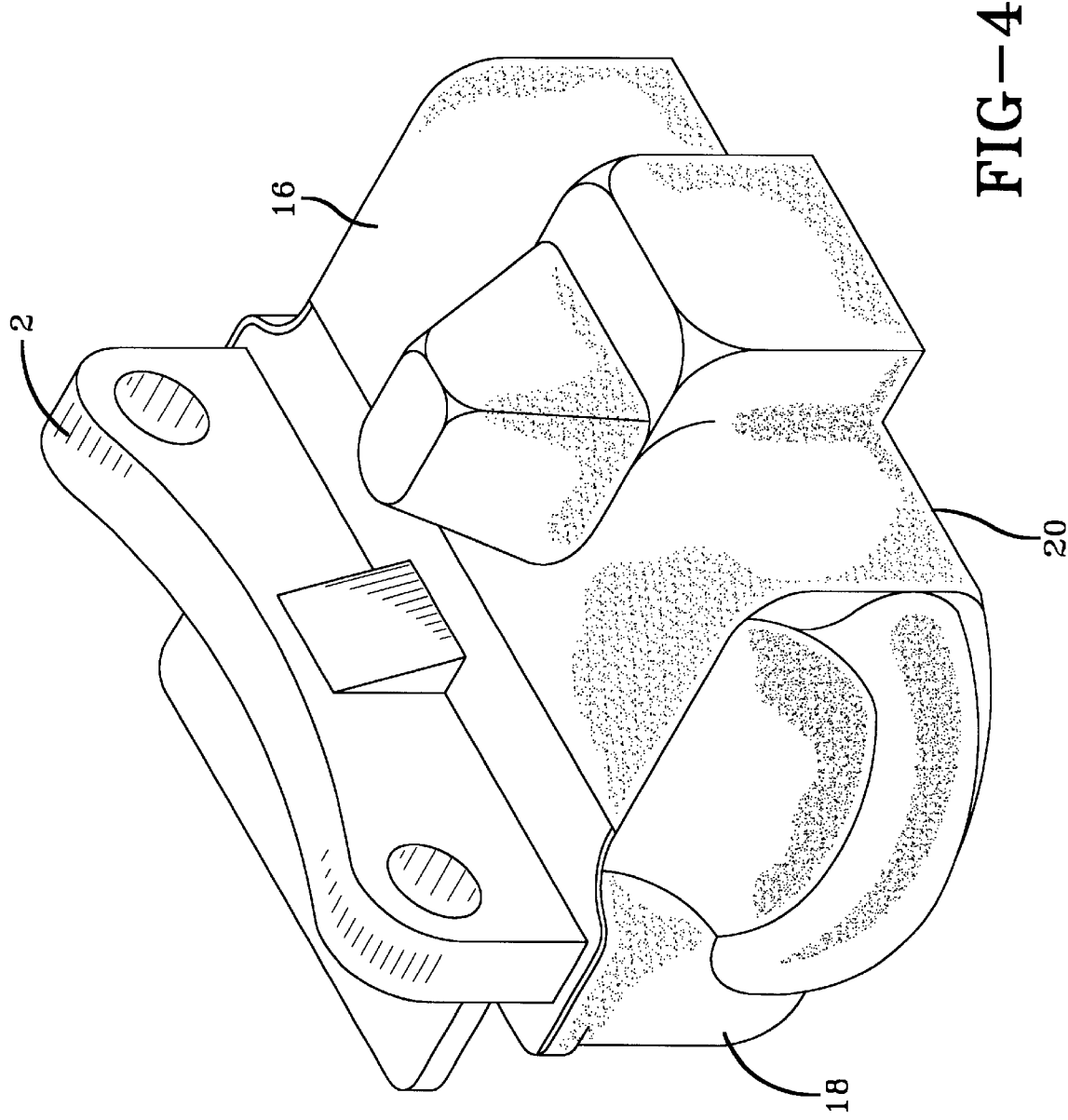
FIG. 4 is a perspective view of the first bracket assembly after molding and vulcanizing rubber.

Although the invention is directed to bonding vulcanized rubber to a metal substrate, in a preferred embodiment, the vulcanized rubber is included as an element of a first metal substrate assembly which is then bonded across a rubber interface to a second metal substrate assembly. Referring to FIGS. 2 and 3, the mount assembly is formed by providing a first metal substrate 2. This metal substrate 2 is of intricate design, having flanges 4, 6, 8, 10, 12 and 14. It may also be arcuate in configuration. First metal substrate 2 is placed into a mold cavity (not shown) and the mold is closed around first metal substrate 2, metal substrate 2 not filling the mold cavity. Unvulcanized rubber is then introduced into the mold cavity, typically by an injection molding process, thereby filling the remaining volume of the mold and surrounding first metal substrate 2. Preferably the mold cavity which is adjacent to a surface of the rubber which will subsequently form a bond interface is textured so as to impart a textured surface 20 to the rubber as it fills the mold cavity and is vulcanized. Alternatively, surface 20 of the vulcanized rubber may be roughened by a mechanical means or other suitable means. The texturing or roughening of this surface increases the available surface area to allow for better bond strength. Any vulcanizable, moldable rubber is suitable, including, but not limited to neoprene, styrene-butadiene rubber (SBR) and ethylene-propylene-diene terpolymer (EPDM) rubber. The rubber 16 is then vulcanized as it surrounds the metal part forming a first substrate assembly 18 as shown in FIG. 4. The bond between the vulcanized rubber 16 and the first metal substrate 2 is chemical in nature.

First metal substrate 2 may be comprised of any metal. When the first metal substrate is selected from the group of materials including ferrous metals and ferrous alloys, such as steel, it is necessary to provide the metal with a corrosion-resistant coating. Any well-known corrosion resistant coating may be utilized. The preferred material for first metal substrate 2 is a material selected from the group consisting of nonferrous metals and their alloys, preferably an aluminum alloy. While a coating may optionally be applied to these materials to promote improved bonding to the rubber when the part has a complex configuration, such a coating is not required to promote corrosion resistance. A typical material utilized to promote improved bonding to the rubber is a two part adhesive system comprised of a primer and a topcoat, wherein the primer is an adhesive of polymers in an organic solvent and the topcoat is an adhesive overlayer. Bonding between the topcoat and the rubber is promoted by the vulcanization process, so that a strong chemical bond exists between the topcoat and the rubber, in addition to the mechanical bonding which may result from the complex structure 4 the casting itself. The chemical bonding promoted during vulcanization is similar to the method set forth in U.S. Pat. No. 5,030,515 to Ozawa, discussed previously. An adhesive system for this bonding which has been used successfully is CHEMLOK® 205/252 available from Lord Corporation, Erie, Pa. Rubber 16 is vulcanized around metal substrate 2 in the mold in the conventional manner, forming first metal substrate assembly 18 as shown in FIG. 4.

First metal substrate assembly 18 which now includes vulcanized rubber, must be bonded to a second metal substrate 42. Second metal substrate 42 may optionally be pretreated in an iron-phosphate solution to provide temporary corrosion resistance. While any metal may be used for second metal substrate 42, including both ferrous and nonferrous alloys, in a preferred embodiment, second metal substrate 42 is a steel stamping 40 which is first cleaned using a cleaner to remove particles, oils or other materials. Any cleaner may be used, but alcohol or toluene are preferred.

Figure 5:
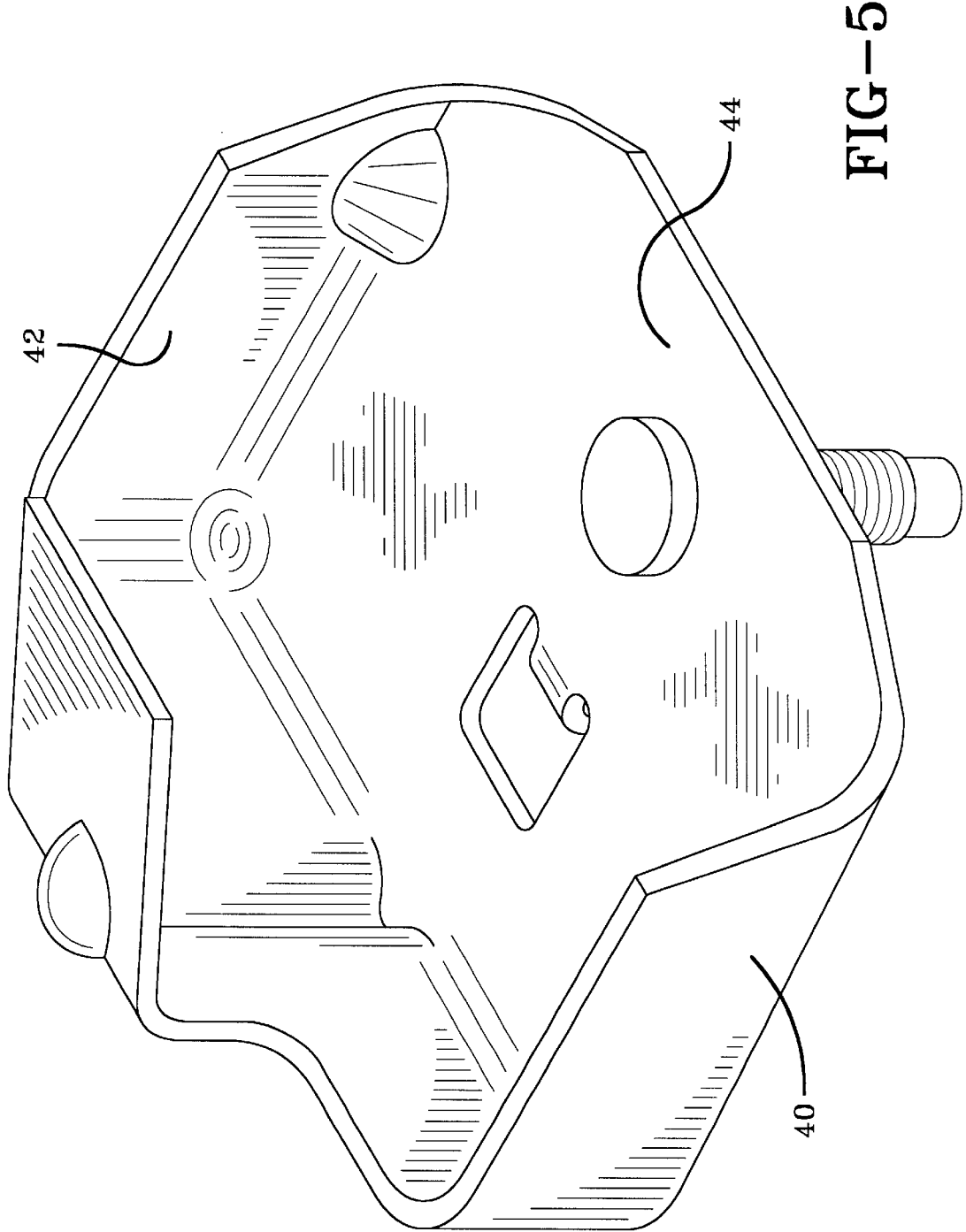
FIG. 5 is a perspective view of the second bracket assembly after coating with an epoxy coating.

After being cleaned, epoxy powder is electrostatically applied to the second metal substrate. FIG. 5 is a perspective view of the second metal substrate assembly 44 after electrostatic spraying of the epoxy powder over the second metal substrate 42. The powdered epoxy compositions which are employed in the practice of the present invention are well-known in the art and need not be discussed here in detail. Such compositions generally comprise a blend of epoxy resins, pigment, filler corrosion inhibitors and the like. However, because the epoxy powder is electrostatically applied to the surface of the metal, flow control additives and curing agents, normally included with such powdered epoxy resin compositions, are not required.

Various additives to the epoxy powder such as fillers, pigments and corrosion inhibitors may include substantially inert solid materials, including without limitation carbon black, silica, titanium dioxide and anticorrosion pigments in amounts known in the art without deleteriously affecting the advantageous properties thereof. One epoxy coating successfully used is VE-309 available from Ferro Chemical Corp. of Cleveland Ohio. VE-309 is a proprietary composition, but is a typical epoxy mixture of bis-phenol A, carbon black and other organic powders. However, any phenolic-containing powder should be suitable.

Second metal substrate assembly 44 is then cured at an elevated temperature above about 300° F. (148° C.) and preferably between 400–600° F. (190–316° C.). This cure of the electrostatically sprayed epoxy powder forms a uniform protective layer over the surface of the second metal substrate assembly. The thickness of the cured epoxy coating may vary from about 0.0008 to about 0.002 inches, and typically is from about 0.0015 to about 0.002 inches.

Second metal substrate assembly 44 and first metal substrate assembly 18 are now prepared for bonding. The surface of the second metal substrate assembly 44 is cleaned using an alcohol wipe, taking care to remove any lubricants, dirt or fingerprints which may have been deposited on the surface following the curing process.

The first metal substrate assembly 18 is also prepared for assembly. First, textured or roughened rubber surface 20 is cleaned to remove extraneous particles, dirt, oil, lubricants, or fillers and anti-oxidants which may have bloomed to the surface during vulcanization of the rubber. Although any solvent may be used which accomplishes this cleaning without detrimentally affecting the strength of the vulcanized rubber, methyl ethyl ketone is preferred.

Figure 6:
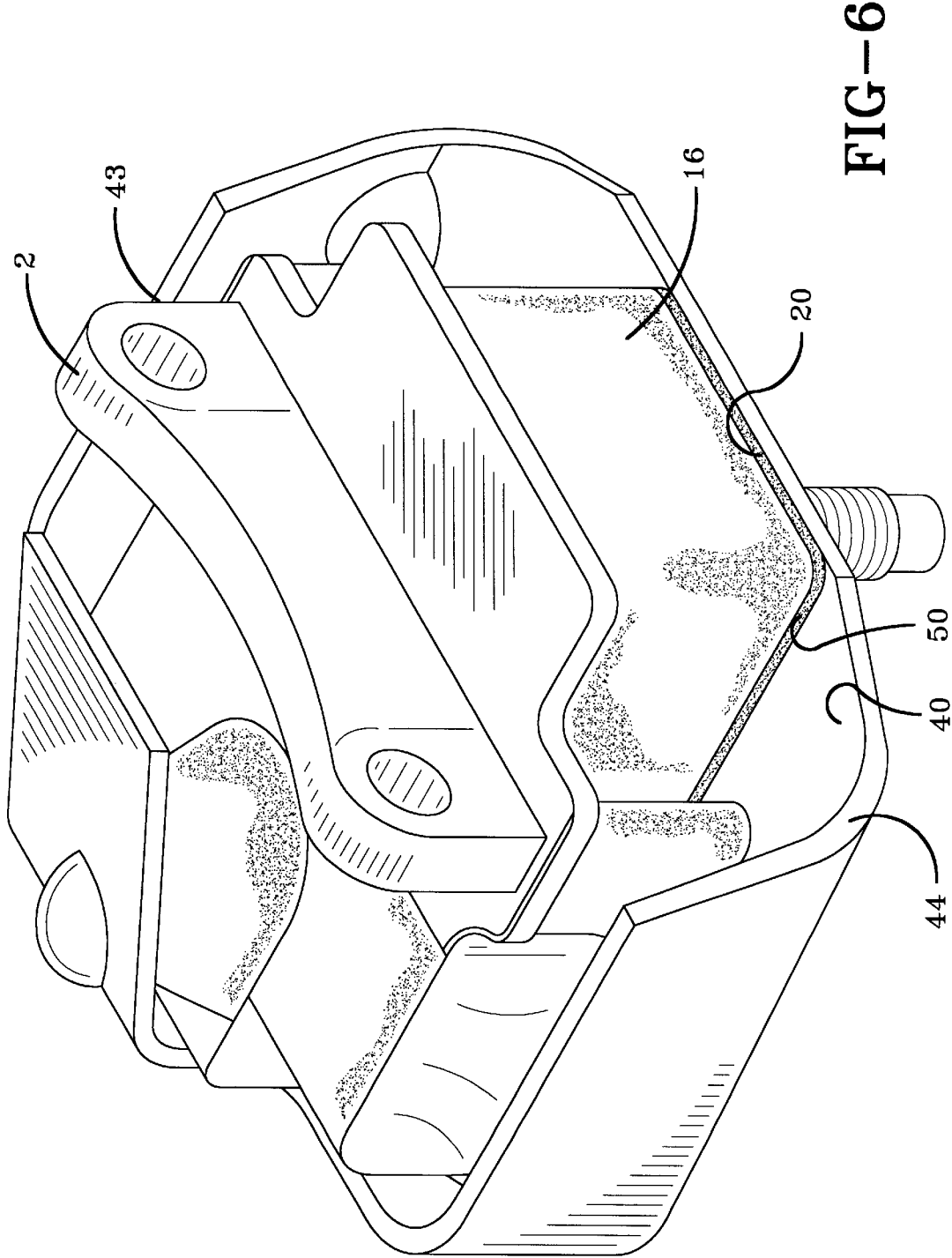
FIG. 6 is a perspective view of the first bracket assembly adhered to the second bracket assembly.

Referring next to FIG. 6, a two part epoxy adhesive 50 is applied to the interface between the textured rubber surface 20 and second metal substrate assembly 44. The first part is a chemical pretreatment which includes chlorine. It is applied to textured surface 20 of the vulcanized rubber, which serves to chlorinate the rubber surface, thereby raising its polarity. This in turn increases the surface energy of the rubber and improves its wetting performance, resulting in better adhesion. An epoxy adhesive is then applied to second metal substrate assembly 44 which is brought in contact with textured rubber surface 20. The epoxy adhesive may be any system having good adhesive properties, and should ideally contain an amine compound. While any epoxy adhesive which produces the requisite results may be used, satisfactory adhesives include CHEMLOK® 330A/B available from Lord Corporation of Erie, Pa. and HYSOL® EA 9460A/b available from Dexter of Seabrook, N.H. The assembly is clamped together using about 1 psi clamping force and cured. Although curing is critical, curing may be accomplished in any one of a number of ways. For example, the assembly may be cured at room temperature, provided that the assembly is undisturbed for at least 8 hours. An elevated temperature cure for an appropriate time corresponding to the selected temperature may also be used, provided that the curing is not performed at a temperature which will result in a deterioration of the vulcanized rubber. Curing temperatures is in the range of 220–275° F. (104–135° C.) for a period of time from 30–60 minutes may be used, but curing temperatures below about 240° C. (116° C.) are preferred as the lower temperatures also reduce the risk of rubber degradation.

As can be seen, the metal-rubber interface is a complex system in which the final interface involves bonding an epoxy adhesive to an epoxy coated metal surface and to an activated vulcanized rubber surface. After curing, the interface is essentially an epoxy between a metal and a vulcanized rubber surface. However, bracket assemblies prepared in accordance with the method of the present invention have been tested and compared to bracket assemblies made by conventional methods, and the brackets prepared in accordance with the present invention provides a durable surface for bonidng of vulcanized rubber. The invention provides the manufacturer not only with the advantage of reduced cost and prat processing, but also with the important advantage of environmental compliance while retaining corrosion resistance.

In light of the foregoing discussion, it will be apparent to those skilled in the art that the present invention is not limited to the embodiments, methods and compositions herein described. Numerous modifications, changes, substitutions and equivalents will now become apparent to those skilled in the art, all of which fall within the scope contemplated by the invention.

What is claimed is:

1. A method for bonding a vulcanized rubber surface to a metal substrate, comprising the steps of:
   (a) electrostatically spraying epoxy-containing powder on to a surface of the metal substrate;
   (b) curing the epoxy-containing powder on the metal substrate to form an epoxy coating on the metal surface;
   (c) providing an amount of previously vulcanized rubber having a surface;
   (d) applying a two part epoxy adhesive at an interface between the previously vulcanized rubber surface and the epoxy coating on the metal surface wherein said two-part epoxy adhesive comprises a first part which is applied to the previously vulcanized rubber surface and a second part which is applied to the epoxy coating on the metal surface; and
   (e) curing under pressure the two-part epoxy adhesive at the interface to form a bond among the previously vulcanized rubber surface, the two-part epoxy adhesive and the epoxy coating on the metal surface.

2. The method of claim 1, further comprising the step of degreasing the metal surface before step (a).

3. The method of claim 1, wherein the previously vulcanized rubber surface is roughened.

4. The method of claim 3, further comprising the step of cleaning the previously vulcanized, roughened rubber surface.

5. The method of claim 1, further comprising prior to step (d) the step of applying a chemical pretreatment to the previously vulcanized rubber surface in order to chlorinate the previously vulcanized rubber surface.

6. The method of claim 1, wherein the metal substrate is selected from the group consisting of ferrous metals, ferrous alloys, non-ferrous metals, and non-ferrous alloys.

7. The method of claim 6, wherein the metal substrate is an aluminum-containing alloy.

8. The method of claim 1, wherein the epoxy-containing powder comprises a mixture of bis-phenol A and carbon black.

* * * * *